United States Patent
Lee et al.

(10) Patent No.: US 7,412,354 B2
(45) Date of Patent: *Aug. 12, 2008

(54) METHOD FOR MEASURING QUANTITY OF USAGE OF CPU

(75) Inventors: Sang Ho Lee, Seoul (KR); Jang Keun Oh, Kyunggi-Do (KR)

(73) Assignee: Protimus Technologies LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/410,834

(22) Filed: Apr. 26, 2006

(65) Prior Publication Data

US 2006/0212269 A1    Sep. 21, 2006

Related U.S. Application Data

(63) Continuation of application No. 11/240,634, filed on Oct. 3, 2005, which is a continuation of application No. 10/879,091, filed on Jun. 30, 2004, now Pat. No. 7,010,466, which is a continuation of application No. 09/930,447, filed on Aug. 16, 2001, now Pat. No. 6,804,630.

(30) Foreign Application Priority Data

Aug. 28, 2000    (KR) .............................. 2000-50037

(51) Int. Cl.
    G06F 15/00    (2006.01)
(52) U.S. Cl. ...................................... 702/186; 718/107

(58) Field of Classification Search ................. 702/123, 702/176–179, 182–183, 186–187, 189; 709/100, 709/102, 104–105; 714/38; 707/10; 710/22, 710/25, 46, 48; 718/107; 717/130
See application file for complete search history.

(56) References Cited

U.S. PATENT DOCUMENTS 5,167,024 A    11/1992    Smith et al. .................. 395/375

(Continued)

FOREIGN PATENT DOCUMENTS

JP    10143274 A    5/1998

(Continued)

OTHER PUBLICATIONS

WinTasks 4 Professional User's Manual no date.

(Continued)

*Primary Examiner*—Hal D Wachsman
*Assistant Examiner*—Mary C Baran
(74) *Attorney, Agent, or Firm*—Technology, Patents & Licensing, Inc.

(57) ABSTRACT

The present invention relates to a method for measuring a quantity of usage of a CPU, in particular to a method for measuring a quantity of usage of a CPU which is capable of getting a credible quantity of usage of a CPU without amending an algorithm in order to adapt it to the an operating system, e.g., MS-Windows System, or requiring a complicated code. The method uses various algorithms provided by the operating system on the behalf of a registry storing a quantity of usage of a CPU inside a system. Accordingly the present invention can measure a quantity of usage of a CPU easily without lowering a performance of the operating system.

7 Claims, 2 Drawing Sheets

U.S. PATENT DOCUMENTS

| | | | |
|---|---|---|---|
| 5,239,652 A | 8/1993 | Seibert et al. | 395/750 |
| 5,355,484 A | 10/1994 | Record et al. | 717/127 |
| 5,463,775 A | 10/1995 | DeWitt et al. | 702/186 |
| 5,475,848 A | 12/1995 | Ikeda | 713/322 |
| 5,511,205 A | 4/1996 | Kannan et al. | 395/750 |
| 5,537,656 A | 7/1996 | Mozdzen et al. | 713/323 |
| 5,586,332 A | 12/1996 | Jain et al. | 395/750 |
| 5,590,341 A | 12/1996 | Matter | 395/750 |
| 5,623,647 A | 4/1997 | Maitra | 713/501 |
| 5,719,800 A | 2/1998 | Mittal et al. | 364/707 |
| 5,754,436 A | 5/1998 | Walsh et al. | 364/483 |
| 5,761,517 A | 6/1998 | Durham et al. | 395/750.04 |
| 5,768,602 A | 6/1998 | Dhuey | 395/750 |
| 5,784,628 A | 7/1998 | Reneris | 395/750.01 |
| 5,787,294 A | 7/1998 | Evoy | 713/320 |
| 5,797,115 A | 8/1998 | Fuller | 702/186 |
| 5,812,860 A | 9/1998 | Horden et al. | 395/750.04 |
| 5,825,674 A | 10/1998 | Jackson | 713/321 |
| 5,838,976 A | 11/1998 | Summers | 717/130 |
| 5,983,357 A | 11/1999 | Sun | 713/324 |
| 6,003,061 A | 12/1999 | Jones et al. | 709/104 |
| 6,006,248 A | 12/1999 | Nagae | 709/105 |
| 6,009,452 A | 12/1999 | Horvitz | 709/102 |
| 6,029,119 A | 2/2000 | Atkinson | 702/132 |
| 6,049,798 A | 4/2000 | Bishop et al. | 707/10 |
| 6,076,171 A | 6/2000 | Kawata | 713/501 |
| 6,079,025 A | 6/2000 | Fung | 713/323 |
| 6,092,095 A | 7/2000 | Maytal | 709/100 |
| 6,198,245 B1 | 3/2001 | Du et al. | 318/471 |
| 6,216,235 B1 | 4/2001 | Thomas et al. | 715/501 |
| 6,219,723 B1 | 4/2001 | Hetherington et al. | 710/18 |
| 6,272,642 B2 | 8/2001 | Pole, II et al. | 713/300 |
| 6,298,448 B1 | 10/2001 | Shaffer et al. | 713/322 |
| 6,384,651 B1 | 5/2002 | Horigan | 327/175 |
| 6,397,340 B2 | 5/2002 | Watts et al. | 713/322 |
| 6,415,388 B1 | 7/2002 | Browning et al. | 713/322 |
| 6,434,714 B1 | 8/2002 | Lewis et al. | 714/38 |
| 6,446,214 B2 | 9/2002 | Chrysanthakopoulos | 713/310 |
| 6,542,940 B1 | 4/2003 | Morrison et al. | 710/22 |
| 6,564,328 B1 | 5/2003 | Grochowski et al. | 713/320 |
| 6,601,179 B1 | 7/2003 | Jackson et al. | 713/322 |
| 6,684,341 B1 | 1/2004 | Malcolm et al. | 713/320 |
| 6,694,442 B2 | 2/2004 | Yeh | 713/322 |
| 6,754,690 B2 | 6/2004 | Larson | 718/102 |
| 6,804,630 B2 * | 10/2004 | Lee et al. | 702/186 |
| 6,823,516 B1 | 11/2004 | Cooper | 718/108 |
| 7,010,466 B2 * | 3/2006 | Lee et al. | 702/186 |
| 2003/0045237 A1 | 3/2003 | Gardner et al. | 455/63 |

FOREIGN PATENT DOCUMENTS

| | | |
|---|---|---|
| KR | 90-5435 | 3/1990 |

OTHER PUBLICATIONS

SmartLine Inc., Dec. 14, 1999, Remote Task Manager.

* cited by examiner

METHOD FOR MEASURING QUANTITY OF USAGE OF CPU

This application is a continuation of U.S. patent application Ser. No. 11/240,634 filed Oct. 3, 2005, which is a continuation of U.S. patent application Ser. No. 10/879,091 filed Jun. 30, 2004 (U.S. Pat. No. 7,010,466), which is a continuation of U.S. patent application Ser. No. 09/930,447, filed Aug. 16, 2001 (U.S. Pat. No. 6,804,630), which claims priority to Korean Patent Application No. 50037/2000, filed Aug. 28, 2000. The entire disclosure of the prior applications are considered as being part of the disclosure of the accompanying application and is hereby incorporated by reference therein.

BACKGROUND OF THE INVENTION

1. Field of the Invention

The present invention relates to a method for measuring a quantity of usage of a device, in particular, to a method for measuring a quantity of usage of a CPU.

2. Background of the Related Art

There are various kinds of algorithms for predicting a quantity of usage of a system in the related art. In general, more complicated algorithms yield more credible predictions; less complicated algorithms yield less credible predictions.

In addition, a method for calculating a quantity of usage of a CPU can be differentiated in accordance with an operating system. For example, in a MS-Windows 9x system, system usage of a CPU is updated by the CPU itself using its own algorithm. However, it is recommended to use the registry information when an application program is developed.

Furthermore, because an Operating System (OS) kernel takes charge of the CPU multi-tasking in all threads in a present ready-to-run state, the OS kernel generally knows whether there are OS threads in the ready-to-run state or an action state (all threads do not wait for certain event to resume execution). For example, when the OS determines there are no threads in the ready-to-run state, a value of a power management timer is read, and the CPU is maintained in sleep mode. In this mode the power management timer operates independently from the CPU, and measures accurately time duration of reads (regular increase with a fixed rate of 3.579545 Mhz). After that, the OS reads the value of the power management timer when the CPU is waken up.

In addition, measuring time difference between initial timer read in the sleep mode of the CPU and second timer read in the wake mode is a measure of idle time of the CPU. In other words, the CPU idle time can be measured by dividing a total of the difference between the second timer and initial timer for a large sampling interval, by the sampling interval. It can be described as in Equations 1 and 2, Idle Ticks=Sum(across sampling interval)[Second Timer Read-Initial Timer Read]    [Equation 1]

CPU Idle(%)=Idle Ticks×Tick Period(s)/Sampling Interval(s)×100%    [Equation 2]

Herein, the first timer read describes a processor in sleep mode (initial timer read), and the second timer read describes the CPU is in the wake mode.

In contrast, related art algorithms yield large values of CPU usage, even though the system does not perform an operation. In addition, in the related art, there is no time interval information available for updating a quantity of usage of a CPU, accordingly it is not appropriate for measuring a quantity of usage of a CPU in short time. In addition, in the related art, because an algorithm has to be amended in order to adapt it to the MS-Windows system or a complicated code is required, it degrades the MS-Windows system performance.

SUMMARY OF THE INVENTION

An object of the invention is to solve at least the above problems and/or disadvantages and to provide at least the advantages described hereinafter.

An object of the present invention is to provide a method for measuring a quantity of usage of a CPU which is capable of getting directly a result by using various functions provided by the operating system on the behalf of a registry storing a quantity of usage of a CPU inside the system.

To achieve at least the above objects and advantages in a whole or in parts and in accordance with the purpose of the present invention, as embodied and broadly described, there is provided a method for measuring processing resource utilization in a personal computer that includes providing an operating system registry containing a processor usage information of a processor, reading execution times of threads during a predetermined timer time interval using one or more manager functions, wherein the threads are executed by the processor, adding execution time values for each thread that is not a system thread to get a first total, determining a quantity of usage of the processor using the first total, and updating the processor usage information in the operating system registry.

To further achieve at least the above objects and advantages in a whole or in parts and in accordance with the purpose of the present invention, as embodied and broadly described, there is provided a method for measuring processing resource utilization in a personal computer that includes providing a personal computer executable process algorithm for monitoring the usage of a processor, reading execution times of threads during a predetermined timer time interval using one or more manager functions, wherein the threads are executed by the processor, adding execution time values for each thread that is not a system thread to get a first total, and determining a quantity of usage of the processor using the first total.

To further achieve at least the above objects and advantages in a whole or in parts and in accordance with the purpose of the present invention, as embodied and broadly described, there is provided a method for measuring CPU usage, the CPU executing threads includes reading the execution times of all threads except for a system thread during a prescribed timer time interval, adding the values of the execution times to obtain a first sum, subtracting a second sum of previously executed and stored thread execution times from the first sum to obtain a result, and calculating a CPU usage by dividing the result by the prescribed timer time interval.

To further achieve at least the above objects and advantages in a whole or in parts and in accordance with the purpose of the present invention, as embodied and broadly described, there is provided a method for updating a resource utilization value in an updatable usage value register contained in a processing resource circuit that includes reading execution times of a first plurality of threads during a time interval, adding the read execution times of the first plurality of threads to obtain a first total, calculating a current resource utilization information based on a calculation involving the first total and the time interval, and updating the updatable usage value register with the current resource utilization information.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
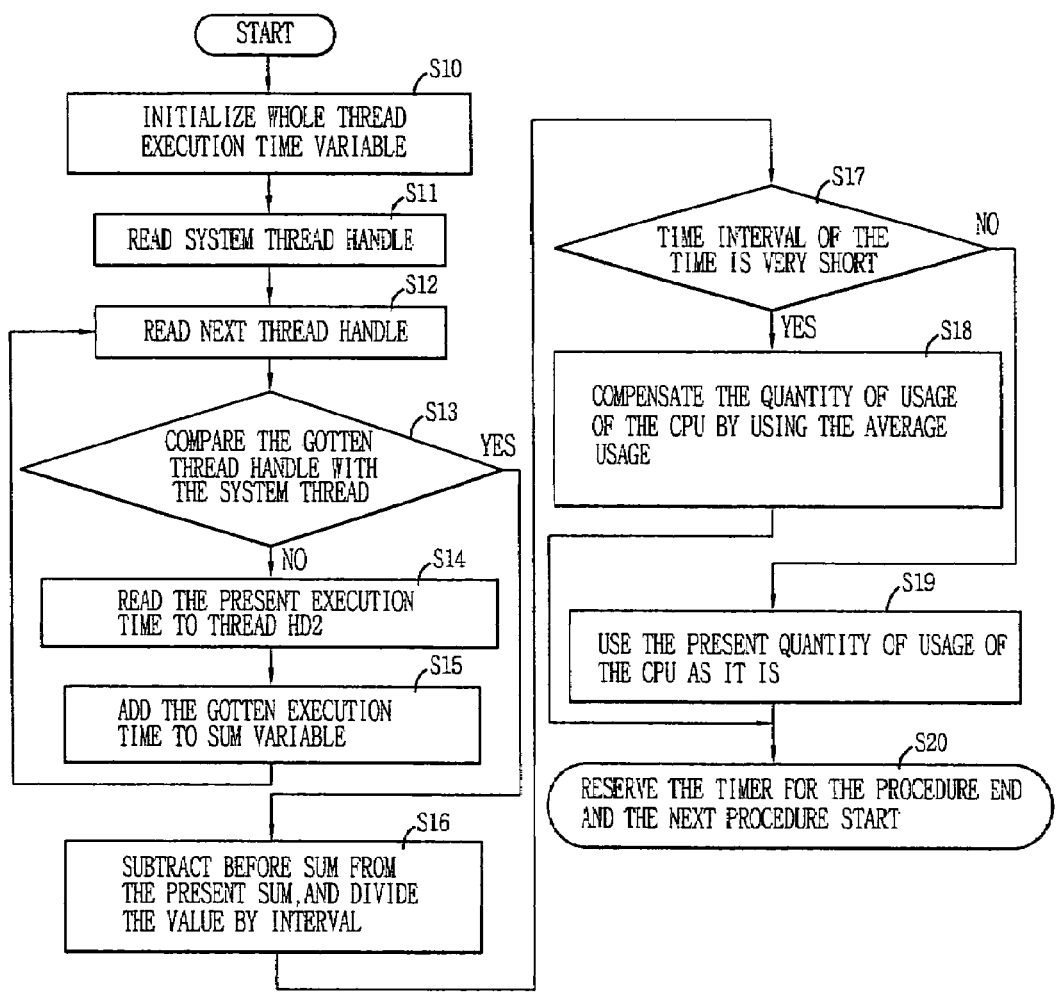
FIG. 1 is a detailed flow chart illustrating a method for measuring a quantity of usage of a CPU in accordance with an embodiment of the present invention.

Hereinafter, a thread and a handle in accordance with the present invention will be described, and an embodiment in accordance with the present invention will now be described in detail with reference to accompanying FIGS. 1 and 2. First, a thread used in a Windows system is an execution unit in an application program. The each thread is combined with CPU commands, and a set of CPU registers, stacks, etc.

In the Windows OS, a process can have several threads, and the thread can make other threads again. In the meantime, a kernel as the core of the Windows OS uses a service called a scheduler allocating CPU time to each execution thread. When a process is getting made, the system makes automatically one thread for the process. The thread is called a 'basic thread' of the process, the basic thread can make additional threads, and the each additional thread can make threads also.

In addition, in the Windows system, it is not possible to approach the kernel, a Graphic Device Interface (GDI) or other object directly, but it is possible through a handle. In general, because the objects have mobility in a memory by a memory manager of the Windows, it is possible to search and approach the objects only through their handles.

A first embodiment in accordance with the present invention will now be described in detail with reference to accompanying FIGS. 1 and 2. FIG. 1 is a detailed flow chart illustrating a method for measuring a quantity of usage of a CPU in accordance with a preferred embodiment of the present invention. In other words, a quantity of usage of a CPU is calculated by using a system service provided from MS-Windows. In Windows, a VMM (Virtual Machine Manager) service usable in an embodiment of a VDD (Virtual Device Driver) is provided. In other words, a service related to a timer and threads is used in the VMM service, and preferably operating at a ring 0 level.

In general, a program operated in the system is classified as a thread, and the thread is a minimum unit of execution. Herein, the execution means the CPU is used. As described in FIG. 1, a variable (SUM) storing the sum of the execution time of all threads excluding the system thread is initialized as in step S10. A handle value Hd1 is then read as a pointer of the system thread in step S11, and the next thread handle value Hd2 is read in step S12. After reading the handle value Hd1 of the system thread and handle value Hd2 of the next thread, they are compared in step S13 to determine whether the read values are the same. In other words, it is judged whether the all thread values have been read by comparing the handle value read most recently with the handle value of the system thread.

Herein, the thread handles are executed repeatedly by scheduling of the operating system. The operating system also manages information about the thread and execution of it. In addition, Windows has the VMM service information about the thread execution. For example, the VMM service comprises a function (Get_Sys_Thread_Handle) finding a handle of the first thread (system thread), a function (Get_Next_Thread_Handle) finding a handle of the next thread, and a function (_GetThreadExecTime) finding execution time after a thread generation etc.

After that, in the comparing process of step S13 of the thread handle, when the thread handle value of the system is different from the next thread handle value, execution time of the next thread handle up to the present is read in step S14. The execution time is then added to the variable SUM in step S15. In judging whether the all thread handles are read by comparing the read values, when the thread handle value of the system is different from the next thread handle value, the above-mentioned process is performed repeatedly until the next thread value approaches to the thread handle value of the system.

When the thread handle value of the system is the same as the last thread handle value, the execution time of the all thread handles excluding the handle value of the system thread is stored in the variable SUM. Accordingly, the sum execution time (before SUM) of the thread handles stored formerly is subtracted from the total execution time (present SUM) of the thread handles stored in the variable SUM, and the subtracted value is divided by the time interval at step S16. Herein, the value divided by the time interval is a quantity of usage of a CPU (CPU_USAGE).

For example, when the total execution time of the formerly stored thread handles is 100 seconds and the total execution time of the present thread handles is 105 seconds after a 10 second interval, a value found by dividing 10 seconds by 5 seconds as the ratio between the execution time (100 seconds) of the former stored thread handle and the execution time (105 seconds) of the present execution thread handle is 50% as the quantity of usage of the CPU (CPU_USAGE). In other words, the execution time for the interval is found by calculating a total of the execution time of all the thread handles excluding the handle of the system thread at each interval by using the VMM service, and subtracting the former calculated total execution time from the grand total. And, a quantity of usage of a system is measured by dividing the found execution time for the interval by the interval.

In the meantime, when the interval is set shorter, the calculated quantity of usage of the CPU shows more sudden change than a case when the interval is set longer, in order to decrease the sudden variation, a quantity of usage of a CPU is compensated by finding an average value between the former calculated quantities of usage of a CPU (CPU_USAGE_PREV) and the present calculated quantity of usage of a CPU (CPU_USAGE_NOW) in step S18. In other words, when the interval is short in step S17, the calculated quantity of usage of the CPU shows a sudden variation. It shows sudden variation also however, in an application construction responding sensitively in accordance with a quantity of usage of a CPU. Accordingly, the above-described sudden variation of the calculated quantity of usage of the CPU can be prevented by compensating the calculated quantity of usage of the CPU. On the contrary, when the interval is sufficiently long, the calculated quantity of usage of the CPU is maintained as it is in step S19. The total procedure ends after storing the usage values and reserving the time for the next procedure.

Figure 2:
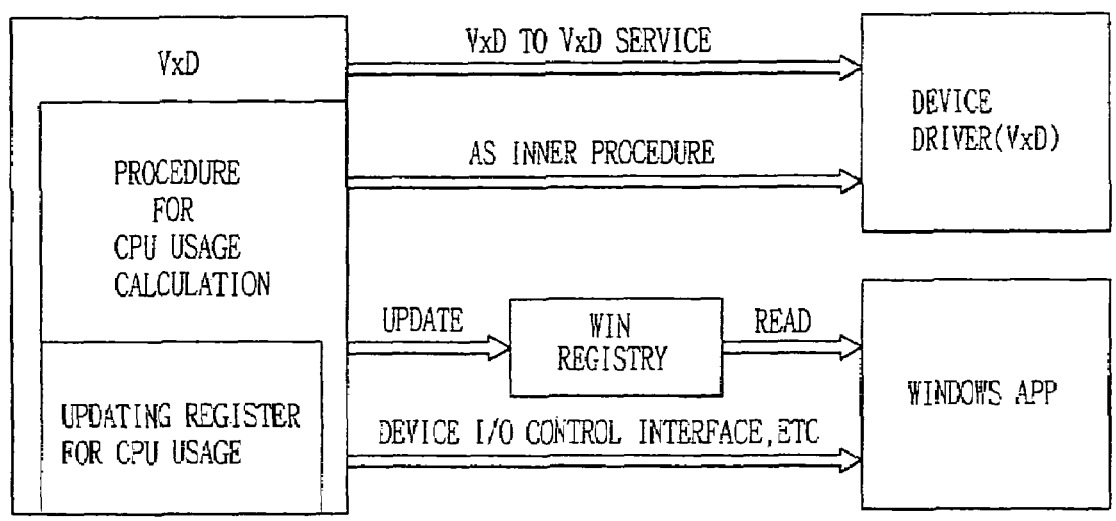
FIG. 2 illustrates an interface between a procedure for calculating a quantity of usage of a CPU and an outer program.

FIG. 2 illustrates an interface between a procedure for calculating a quantity of usage of a CPU and another program. It is possible to update a quantity of usage of a CPU calculated by the algorithm of FIG. 1 to a registry or to access in the Windows program through an interface between an application program (win App) and a VxD or other device driver. As described above, the calculated quantity of usage of the CPU of FIG. 1 is updated continually to a memory. In the other device driver (VxD), a quantity of usage of a CPU can be gotten through an interfacing method between device drivers. In addition, a method reading a quantity of usage of a CPU directly by using the application program and device I/O control can be used.

As described above, the method for measuring the quantity of usage of the CPU in accordance with the present invention can measure a quantity of usage of a CPU with higher confidence by using various functions provided by an operating system. In addition, a power consumption in a system (computer) decreases by adjusting a clock pulse of a CPU with the method for measuring the quantity of usage of the CPU in accordance with the present invention. In addition, the method for measuring the quantity of usage of the CPU in accordance with the present invention can be adapted to various applications based on the system execution requirement, and it is very useful for an application monitoring and reporting a load of a CPU in accordance with an operation state of a system.

In addition, because the method for measuring a quantity of usage of a CPU in accordance with the present invention is embodied in a device driver (VxD) level, control of a system is useful. In addition, because the method for measuring a quantity of usage of a CPU in accordance with the present invention uses a basic service provided from MS-Windows, there is no need to amend an algorithm in order to adapt it for the other MS-Windows nor does it require a complicated code, and the present invention can measure a quantity of usage of a CPU simply, and without lowering performance of the MS-Windows system.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method for measuring processing resource utilization in a personal computer, comprising:
   providing an operating system registry containing a processor usage information of a processor in a computer system;
   reading execution times of threads during a predetermined timer time interval using one or more manager functions, wherein the threads are executed by the processor;
   adding execution time values for each thread that is not a system thread to get a first total;
   determining a quantity of usage of the processor using the first total; and
   updating the processor usage information in the operating system registry.

2. A method for measuring processing resource utilization in a personal computer, comprising:
   providing a personal computer executable process algorithm for monitoring the usage of a processor;
   reading execution times of threads during a predetermined timer time interval using one or more manager functions, wherein the threads are executed by the processor;
   adding execution time values for each thread that is not a system thread to get a first total; and
   determining a quantity of usage of the processor using the first total, wherein the quantity of usage is used by the personal computer.

3. A method for measuring CPU usage, the CPU executing threads, comprising:
   reading the execution times of all threads except for a system thread during a prescribed timer time interval;
   adding the values of the execution times to obtain a first sum;
   subtracting a second sum of previously executed and stored thread execution times from the first sum to obtain a result; and
   calculating a CPU usage by dividing the result by the prescribed timer time interval, wherein the CPU usage is stored in a memory.

4. A method for updating a resource utilization value in an updatable usage value register contained in a processing resource circuit, comprising:
   reading execution times of a first subset of threads executing during a time interval, the first subset excluding system threads;
   adding the read execution times of the first subset of threads to obtain a first total;
   calculating a current resource utilization information based on a calculation involving the first total and the time interval; and
   updating the updatable usage value register with the current resource utilization information.

5. An article including a machine-readable storage medium containing instructions, said instructions, when executed, cause a personal computer to:
   provide an operating system registry containing a processor usage information of a processor;
   read execution times of threads during a predetermined timer time interval using one or more manager functions when the threads are executed by the processor;
   add execution time values for each thread that is not a system thread to get a first total;
   determine a quantity of usage of the processor using the first total; and
   update the processor usage information in the operating system registry.

6. An article including a machine-readable storage medium containing instructions, said instructions, when executed, cause a personal computer to:
   provide a personal computer executable process algorithm to monitor the usage of a processor;
   read execution times of threads during a predetermined timer time interval using one or more manager functions when the threads are executed by the processor;
   add execution time values for each thread that is not a system thread to get a first total;
   determine a quantity of usage of the processor using the first total; and
   store the quantity of usage of the processor in the personal computer.

7. An article including a machine-readable storage medium containing instructions, said instructions, when executed, cause a computer system to:
   read the execution times of all threads except for a system thread during a prescribed timer time interval;
   add the values of the execution times to obtain a first sum;
   subtract a second sum of previously executed and stored thread execution times from the first sum to obtain a result; and
   calculate a CPU usage by dividing the result by the prescribed timer time interval; and
   use the CPU usage in the computer system.

* * * * *